US007920899B2

United States Patent
Jain

(10) Patent No.: US 7,920,899 B2
(45) Date of Patent: Apr. 5, 2011

(54) ELECTRONIC DEVICE WITH WIRELESS CARD TO COMMUNICATE WITH A PLURALITY OF NETWORK SERVICE PROVIDERS

(75) Inventor: Prashant Jain, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 12/009,200

(22) Filed: Jan. 17, 2008

(65) Prior Publication Data

US 2009/0186656 A1 Jul. 23, 2009

(51) Int. Cl.
H04W 48/16 (2009.01)
H04W 88/06 (2009.01)

(52) U.S. Cl. ............... 455/558; 455/432.2; 455/551; 455/552.1; 455/445

(58) Field of Classification Search .......... None
See application file for complete search history.

(56) References Cited

U.S. PATENT DOCUMENTS

| | | | |
|---|---|---|---|
| 6,018,653 A * | 1/2000 | Hietalahti et al. | 455/406 |
| 6,948,090 B2 | 9/2005 | King | |
| 6,968,378 B2 | 11/2005 | Heffernan et al. | |
| 2001/0008014 A1 | 7/2001 | Farrell et al. | |
| 2001/0023892 A1 | 9/2001 | Hendrick | |
| 2002/0083176 A1 | 6/2002 | Heffernan et al. | |
| 2003/0220022 A1 | 11/2003 | Kawaguchi et al. | |
| 2004/0022216 A1 * | 2/2004 | Shi | 370/335 |
| 2004/0195313 A1 | 10/2004 | Lee | |
| 2005/0190918 A1 | 9/2005 | Burns | |
| 2005/0282544 A1 | 12/2005 | Oommen et al. | |
| 2005/0288056 A1 | 12/2005 | Bajikar et al. | |
| 2006/0154645 A1 | 7/2006 | Valkenburg | |
| 2006/0285663 A1 | 12/2006 | Rathus et al. | |
| 2007/0143828 A1 | 6/2007 | Jeal et al. | |
| 2007/0154014 A1 | 7/2007 | Aissi et al. | |

OTHER PUBLICATIONS

International Search Report and Written Opinion dated Aug. 25, 2009, pp. 11.

* cited by examiner

*Primary Examiner* — Philip J Sobutka

(57) ABSTRACT

A wireless network communications system comprises an electronic device having a generic wireless card disposed therein, the electronic device configured to receive at least one of a plurality of different types of identity modules therein, the generic wireless card automatically configured to communicate using one of a plurality of network service providers based on a particular identity module loaded into the electronic device.

21 Claims, 2 Drawing Sheets

ELECTRONIC DEVICE WITH WIRELESS CARD TO COMMUNICATE WITH A PLURALITY OF NETWORK SERVICE PROVIDERS

BACKGROUND

Wireless cards are typically configured for a specific network service provider. Thus, electronic devices comprising the wireless cards are typically individually configured for the specific network service provider. As a result, manufacturers of the electronic devices must make different electronic devices specifically configured for each network service provider, thereby driving up costs associated with storing, tracking, and maintaining the differently configured electronic devices.

DETAILED DESCRIPTION OF THE DRAWINGS

Figure 1:
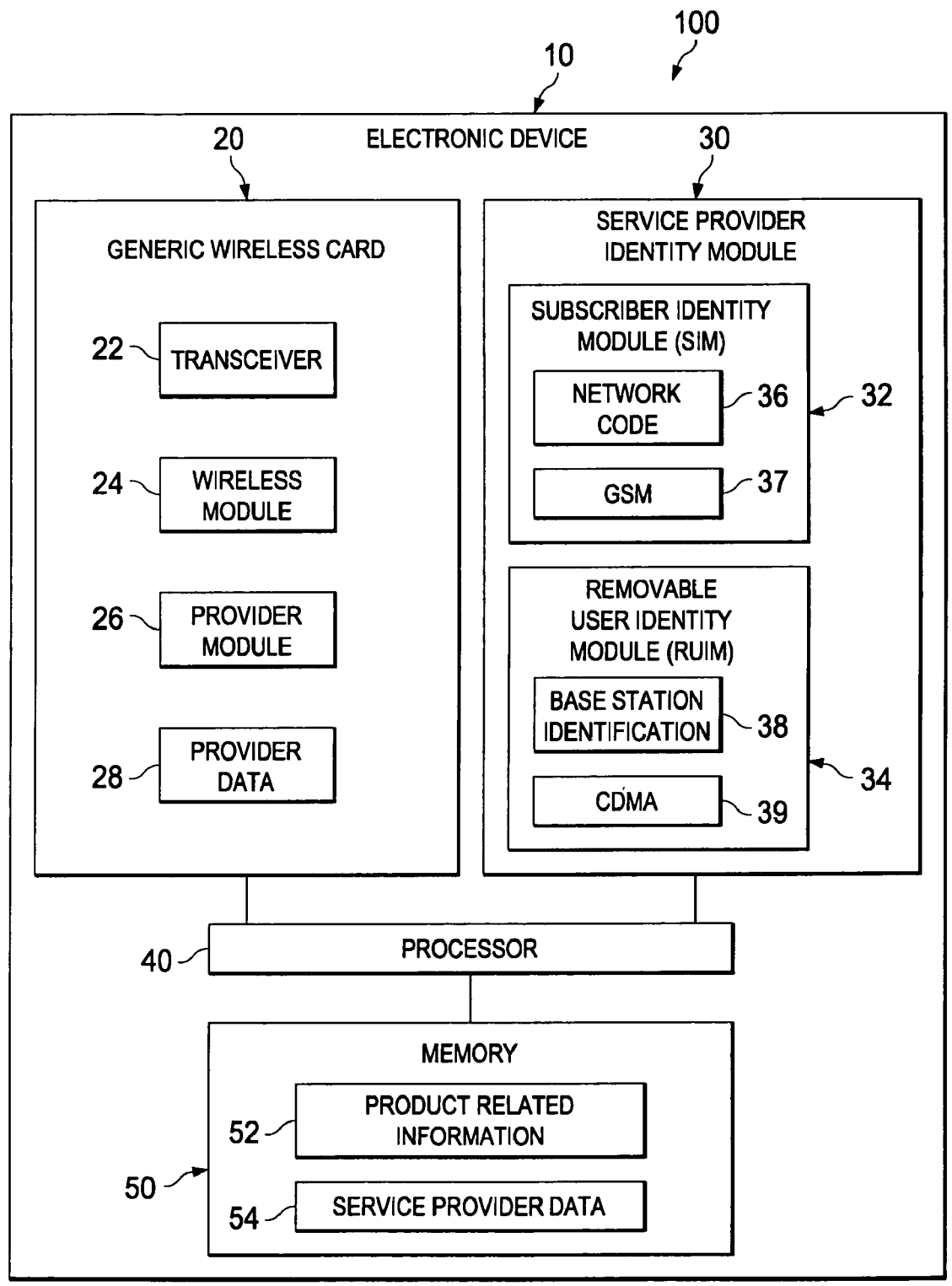
FIG. 1 illustrates an embodiment of a wireless network communications system for an electronic device.

FIG. 1 illustrates an embodiment of a wireless network communications system 100 for an electronic device 10. Wireless network communications system 100 comprises a generic wireless card 20 disposed within electronic device 10 and configured to communicate using one of a number of network service providers based on a particular identity module loaded into electronic device 10. Electronic device 10 may comprise any type of portable or non-portable electronic device including, but not limited to, a desktop computer, a laptop computer, a notebook computer, a tablet computer, a personal digital assistant (PDA), a cellular phone, or any other type of portable and/or non-portable electronic device.

In FIG. 1, electronic device 10 comprises generic wireless card 20, a service provider identity module 30, a processor 40, and a memory 50. Components of electronic device 10 may comprise hardware, software, firmware, or any combination thereof. In FIG. 1, generic wireless card 20 comprises a transceiver 22, a wireless module 24, a provider module 26, and provider data 28. Transceiver 22 and wireless module 24 enable generic wireless card 20 to communicate, transmit, and/or receive communications to and/or from other electronic devices. In some embodiments, generic wireless card 20 is configured to communicate and/or associate with a number of different network service providers using transceiver 22 and wireless module 24. A "network service provider" as defined herein is any provider of wireless, cable, internet, and/or network communication services which can operate using any type of communications channel access method. A "communications channel access method," as used herein, is a method enabling multiple terminals connected on the same physical medium to communicate over the particular channel. Example communications channel access methods include, but are not limited to, Global System for Mobile (GSM) communication, Code Division Multiple Access (CDMA), Universal Mobile Telecommunication System (UMTS), Worldwide Interoperability for Microwave Access (WiMAX), Ultra Mobile Broadband (UMB), and Long Term Evolution (LTE).

Wireless module 24 is configured to compress and/or decompress data received and/or transmitted by transceiver 22 for communications with one of the network service providers. Provider module 26 and provider data 28 enable generic wireless card 20 to communicate with a service provider regardless of the type of communication channel the provider is using. Provider module 26 determines which network service provider(s) that electronic device 10 will associate for communications. Provider data 28 is a repository for storing data associated with communicating with the identified provider and/or the network serviced by the specified provider. Provider data 28 is any information (e.g., a network code, a country code, an operator identification code, a base station identification number, etc.) which enables generic wireless card 20 to communicate with a specified provider. It should be understood, however, that provider module 26 may also be stored in memory 50 of electronic device 10 or external to electronic device 10.

In FIG. 1, service provider identity module 30 is an interface configured to accept a removable communications device configured for and/or associated with a particular network service provider. In some embodiments, service provider identity module 30 can accept, interface with, and/or receive a subscriber identity module (SIM) card 32 and/or a removable user identity module (RUIM) card 34 (e.g., a single slot and/or interface). In some embodiments, service provider identity module 30 may be configured to accept both SIM card 32 and RUIM card 34 (e.g., having two slots/interfaces). It should also be understood, however, that service provider identity module 30 may also accept and/or interface with any other type of identity module. It should also be understood that service provider identity module 30 may be configured to operate without either SIM card 32 or RUIM card 34.

SIM card 32 and RUIM card 34 are removable memory devices used to securely store network service provider identification information. For example, SIM card 32 compromises a network code 36 identifying and/or specifying a particular network service provider and/or a corresponding country of operation for the particular network service provider. RUIM card 34 comprises a base station identification 38 used to identify specific network provider(s) servicing and/or using a particular base station. A "base station" as used herein is a radio receiver and/or transmitter used as a hub for wired and/or wireless communications. In some embodiments, a base station operates using a particular frequency and/or bandwidth and is assigned and/or associated with specific network service provider(s). In this embodiment, each base station is given an identification number (e.g., an assigned number or base station identification 38) in order for a communications device (e.g., generic wireless card 20) to recognize and/or determine with which base station and/or service provider(s) to communicate.

In FIG. 1, SIM card 32 is configured to operate using a GSM 37 communications channel access method, and RUIM card 34 is configured to operate using a CDMA 39 communications channel access method. It should be understood, however, that the components in SIM card 32 and RUIM card 34 may be interchanged and/or combined differently to enable SIM card 32 and RUIM card 34 to use any type of communications channel access method.

Processor 40 is coupled to memory 50 which stores product related information 52 and service provider data 54. It should be understood that product related information 52 and service provider data 54 can store information in any format including, but not limited to, an Extensible Markup Language (XML) database, a relational database, a file, or a list. In some embodiments, product related information 52 are communication specifications and/or data identifying protocols and/or procedures to enable generic wireless card 20 to communicate with a specific network service provider. Product related information 52 can comprise any type of communications specifications and/or data including, but not limited to, provider specific network scanning settings, security settings, lock codes, protocols associated with searching and/or reselecting a network, and roaming indicators. In some embodiments, service provider data 54 comprises a list of different network service providers usable by generic wireless card 20 to communicate with another electronic device. In some embodiments, service provider data 54 comprises network service provider identity information (e.g., a list of network code(s) 36, base station identification(s) 38, etc.) which enables a user to select a particular network service provider. In some embodiments, service provider data 54 is stored to electronic device 10 during manufacturing, before and/or at a time of delivery to a consumer, etc.

Thus, electronic device 10 is provided with a generic wireless card 20 configured to operate with a number of different wireless network service providers. Generic wireless card 20 is configured with specific software and/or firmware to enable and/or calibrate generic wireless card 20 to operate with electronic device 10. Thus, in some embodiments of operation, a user loads and/or installs particular identity module information into service provider identity module 30 (e.g., SIM card 32, RUIM card 34, etc.). For example, in some embodiments, a user physically loads and/or installs SIM card 32 and/or RUIM card 34. In some embodiments, a user loads and/or installs software and/or firmware configured to operate and/or provide data for service provider identity module 30.

Once service provider identity module 30 is loaded, provider module 26 determines whether service provider identity module 30 comprises SIM card 32 or RUIM card 34. If service provider identity module 30 comprises SIM card 32, then provider module 26 reads network code 36 to determine and/or identify the network service provider identified by and/or associated with SIM card 32. If service provider identity module 30 comprises RUIM card 34, then provider module 26 reads base station identification 38 to identify the network service provider corresponding to base station identification 38. In some embodiments, if service provider identity module 30 comprises both SIM card 32 and RUIM card 34, then provider module 26 can enable a user to select which network service provider to use and/or use a pre-identified default setting indicating which identity modules to use (e.g., SIM card 32 or RUIM card 34). Once the network service provider is identified, provider module 26 then identifies product related information 52 corresponding to the network service provider specified by either network code 36 or base station identification 38. Provider module 26 then stores the identified product related information 52 as provider data 28 in generic wireless card 20. Wireless module 24 then uses provider data 28 to enable electronic device 10 communications.

In some embodiments, provider module 26 enables a user to select a network service provider by presenting the list of network service providers stored in service provider data 54 for selection by the user. In this embodiment, service provider identity module 30 may or may not comprise SIM card 32 and/or RUIM 34. In some embodiments, if service provider identity module 30 comprises one or both of SIM card 32 and RUIM card 34, then provider module 26 identifies the network service provider selected by the user as the primary network service provider. In other words, in this embodiment, provider module 26 overrides the network service provider identified by SIM card 32 and/or RUIM 34 and automatically configures generic wireless card 20 with product related information 52 associated with the primary network service provider. In some embodiments, provider module 26 may provide the user with a choice to override the network service provider with the primary network service provider or to use the network service provider identified by SIM card 32 and/or RUIM 34.

In some embodiments, wireless network communications system 100 may switch network service providers. In this embodiment, provider module 26 can present the user with the list of network service providers stored in service provider data 54 to enable the user to select another network service provider. Once the network service provider is selected, provider data 28 is re-written with the corresponding product related information 52 associated with the selected network service provider. In some embodiments, service provider identity module 30 may switch from a SIM card 32 to a RUIM card 34 and vice-versa. In this embodiment, provider data 28 is re-written with the corresponding product related information 52 associated with the network service provider identified by RUIM card 34 (or SIM card 32).

Figure 2:
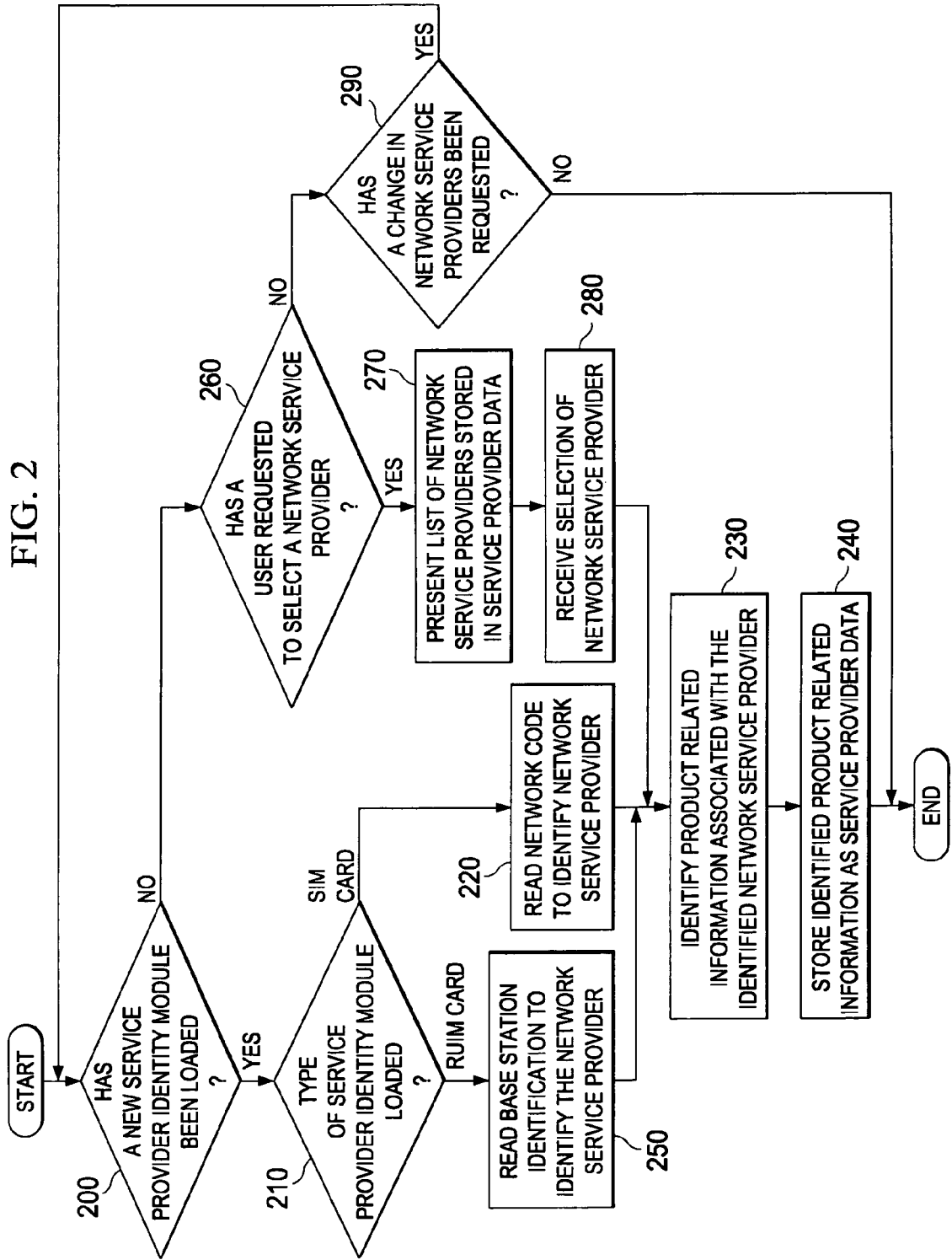
FIG. 2 is a flowchart illustrating an embodiment of a network communications method.

FIG. 2 is a flowchart illustrating an embodiment of a network communications method. The method begins with decision block 200 where provider module 26 determines whether an identity module has been loaded into identity module 30. If a service provider identity module has been loaded ("yes" output to block 200), then provider module 26 determines which type of service provider module was loaded (decision block 210). If the service provider identity module comprises SIM card 32 ("SIM card" output to decision block 210), then provider module 26 reads network code 36 stored on SIM card 32 to identify the network service provider to use (block 220). Provider module 26 then identifies product related information 52 associated with the identified network service provider specified (block 230). Provider module 26 then stores identified product related information 52 as provider data 28 for use in wireless network communications by electronic device 10 (block 240), with the method terminating thereafter.

Returning to decision block 210, if service provider identity module comprises RUIM card 34 ("RUIM card" output to decision block 210), then provider module 26 reads base station identification 38 stored in RUIM card 34 to identify the specified network service provider (block 250), with the method continuing to block 230 thereafter. Returning to decision block 200, if a service provider identity module has not been loaded ("no" output to block 200), then provider module 26 determines whether a user has request to select a network service provider (decision block 260). If a user has requested to select a network service provider ("yes" output to block 260), then provider module 26 presents a list of network service providers stored in service provider data 54 (block 280), with the method continuing to block 230 thereafter.

Returning to decision block 260, if a user has not requested to select a network service provider ("no" output to decision block 260), then the provider module 26 determines whether a change in network service providers has been requested (decision block 290). If a change is requested ("yes" output to block 290), the method proceeds to block 200 thereafter. If a change is not requested ("no" output to block 290), the method terminates thereafter.

Thus, embodiments of electronic device 10 may be manufactured by providing generic wireless card 20 disposed in the electronic device 10, wherein generic wireless card 20 is automatically configured to communicate using one of a plurality of network service providers based on a particular identity module 30 loaded into electronic device 10. Electronic device 10 may also be manufactured by providing the generic wireless card automatically configured to communicate using a network service provider using a Global System for Mobile communications (GSM) system. Electronic device 10 may also be manufactured by providing the generic wireless card automatically configured to communicate using a network provider using a Code Division Multiple Access (CDMA) system. Electronic device 10 may also be manufactured by providing the generic wireless card automatically configured to communicate using one of the plurality of network service providers based on a SIM card loaded into the electronic device. Electronic device 10 may also be manufactured by providing the generic wireless card automatically configured to communicate using one of the plurality of network service providers based on a RUIM card loaded into the electronic device. Electronic device 10 may also be manufactured by providing the generic wireless card automatically configured to communicate using one of the plurality of network service providers based on product related information corresponding to the network service provider. Electronic device 10 may also be manufactured by providing the generic wireless card automatically configured to communicate using one of the plurality of network service providers based on a network code provided by the particular identity module. Electronic device 10 may also be manufactured by providing the generic wireless card automatically, configured to communicate using one of the plurality of network service providers based on a base station identification provided by the particular identity module. Electronic device 10 may also be manufactured by providing the generic wireless card automatically configured to communicate using one of the network service providers selected by a user from a list of network service providers.

The illustrative embodiment maybe implemented in software and can be adapted to run on different platforms and operating systems. In particular, functions implemented by wireless network communications system 100 for example maybe provided by an ordered listing of executable instructions that can be embodied in any computer readable medium for use by or in connection with an instruction execution system apparatus or device such as a computer based system, processor containing system or other system that can fetch the instructions from the instruction execution system apparatus or device and execute the instructions. In the context of this document a "computer readable medium" can be any means that can contain, store, communicate, propagate, or transport the program for use by or in connection with the instruction execution system apparatus or device. The computer readable medium for example that is not limited to an electronic magnetic optical, electro magnetic infrared or semiconductor system apparatus device or propagation medium.

Thus, embodiments of generic wireless system 100 enable a generic wireless card 20 to be provided with the electronic device 10. Thus, manufacturers of electronic device 10 do not need to specify a particular wireless network service provider when manufacturing electronic device 10. Additionally, generic wireless card 20 can communicate using any number of different network service providers.

What is claimed is:

1. A wireless network communications system, comprising:
    an electronic device having a generic wireless card disposed therein, the electronic device configured to receive at least one of a plurality of different types of identity modules therein, the generic wireless card automatically configured to communicate using one of a plurality of network service providers based on a removable memory device and a particular identity module loaded into the electronic device, wherein the electronic device is configured to override a network service provider identified by the removable memory device and replace the network service provider with another network service provider.

2. The system of claim 1, wherein the generic wireless card is automatically configured to communicate using a network service provider using either of a Global System for Mobile communications (GSM) communications system and a Code Division Multiple Access (CDMA) communications system.

3. The system of claim 1, wherein the removable memory device includes a subscriber identity module (SIM) card and a removable user identity module (RUIM) card.

4. The system of claim 1, wherein the generic wireless card is automatically configured to communicate using one of the plurality of network service providers based on product related information stored to the electronic device.

5. The system of claim 1, wherein the generic wireless card is automatically configured to communicate using one of the plurality of network service providers based on a network code provided by the particular identity module.

6. The system of claim 1, wherein the generic wireless card is automatically configured to communicate using one of the plurality of network service providers based on a base station identification provided by the particular identity module.

7. The system of claim 1, wherein the generic wireless card is automatically configured to communicate using one of the plurality of network service providers selected by a user from a list of network service providers.

8. A method of manufacturing an electronic device, comprising:
    providing a generic wireless card disposed in the electronic device, the electronic device configured to receive at least one of a plurality of different types of identity modules therein, the generic wireless card automatically configured to communicate using one of a plurality of network service providers based on a removable memory device in the electronic device and a particular identity module loaded into the electronic device, wherein the electronic device is configured to override a network service provider identified by the removable memory device and replace the network service provider with another network service provider.

9. The method of claim 8, further comprising configuring the generic wireless card to communicate using a network service provider using either of a Global System for Mobile communications (GSM) system and a Code Division Multiple Access (CDMA) system.

10. The method of claim 8, wherein the removable memory device includes a subscriber identity module (SIM) card or a removable user identity module (RUIM) card.

11. The method of claim 8, further comprising configuring the generic wireless card to communicate using one of the plurality of network service providers based on product related information stored to the electronic device.

12. The method of claim 8, further comprising configuring the generic wireless card to communicate using one of the plurality of network service providers based on a network code provided by the particular identity module.

13. The method of claim 8, further comprising configuring the generic wireless card to communicate using one of the plurality of network service providers based on a base station identification provided by the particular identity module.

14. The method of claim 8, further comprising configuring the generic wireless card to communicate using one of the network service providers selected by a user from a list of network service providers.

15. A network communications method, comprising:
- automatically configuring a generic wireless card disposed in an electronic device to communicate using one of a plurality of network service providers based on a removable memory device in the electronic device and a particular identity module loaded into the electronic device, wherein the electronic device is configured to receive at least one of a plurality of different types of identity modules therein; and
- overriding a network service provider identified by the removable memory device and replacing the network service provider with another network service provider selected by a user.

16. The method of claim 15, further comprising configuring the generic wireless card to communicate using a network service provider using either of a Global System for Mobile (GSM) communications system and a Code Division Multiple Access (CDMA) communications system.

17. The method of claim 15, wherein the removable memory device includes a subscriber identity module (SIM) card or a removable user identity module (RUIM) card.

18. The method of claim 15, further comprising configuring the generic wireless card to use one of the plurality of network service providers based on product related information stored to the electronic device.

19. The method of claim 15, further comprising configuring the generic wireless card to use one of the plurality of network service providers based on a network code provided by the particular identity module.

20. The method of claim 15, further comprising configuring the generic wireless card to use one of the plurality of network service providers based on a base station identification provided by the particular identity module.

21. A non-transitory computer-readable medium having stored thereon on instructions set to be executed, the instruction set, when executed by the processor, causes the processor to:
- configure a generic wireless card disposed in an electronic device to communicate using one of a plurality of network service providers based on a removable memory device in the electronic device and a particular identity module loaded into the electronic device, wherein the electronic device is configured to receive at least one of a plurality of different types of identity modules therein; and
- override a network service provider identified by the removable memory device and replace the network service provider with another network service provider selected by a user.

\* \* \* \* \*